(12) United States Patent
Fertner

(10) Patent No.: US 6,408,022 B1
(45) Date of Patent: Jun. 18, 2002

(54) EQUALIZER FOR USE IN MULTI-CARRIER MODULATION SYSTEMS

(75) Inventor: Antoni Fertner, Solna (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/309,298

(22) Filed: May 11, 1999

Related U.S. Application Data

(63) Continuation-in-part of application No. 09/049,384, filed on Mar. 27, 1998, now Pat. No. 6,185,251.

(51) Int. Cl.$^7$ ............................................. H03K 5/159
(52) U.S. Cl. ........................ 375/230; 375/229; 375/231; 375/350; 708/300
(58) Field of Search .................................. 375/229, 230, 375/231, 232, 260, 343, 350; 708/300, 305, 322, 323; 333/18, 28 R

(56) References Cited

U.S. PATENT DOCUMENTS

| | | | |
|---|---|---|---|
| 3,962,637 A | 6/1976 | Motley et al. ............... | 375/232 |
| 4,047,013 A | 9/1977 | Milewski ..................... | 708/305 |
| 5,199,047 A | 3/1993 | Koch ........................... | 375/237 |
| 5,228,058 A * | 7/1993 | Ushirokawa et al. ....... | 375/232 |
| 5,285,480 A | 2/1994 | Chennakeshu et al. ..... | 375/348 |
| 5,461,640 A | 10/1995 | Gatherer ..................... | 375/231 |
| 5,533,067 A | 7/1996 | Jamal et al. ................. | 375/341 |
| 5,559,723 A | 9/1996 | Mourot et al. .............. | 375/229 |
| 5,870,432 A * | 2/1999 | Kerckhove .................. | 375/232 |
| 6,185,251 B1 * | 2/2001 | Fertner ........................ | 375/231 |

FOREIGN PATENT DOCUMENTS

| | | |
|---|---|---|
| EP | 0 052 362 A | 5/1982 |
| EP | 0 097 723 A | 1/1984 |
| EP | 0 204 308 | 12/1986 |
| EP | 0 682 414 A | 11/1995 |
| EP | 0 793 369 A | 9/1997 |
| WO | 93/26096 A | 12/1993 |
| WO | WO 99/50969 | 10/1999 |

OTHER PUBLICATIONS

"Very–High–Speed Digital Subscriber Lines," System Requirements, (T1E1.4/97–131R3), Draft Techical Report—Rev. 12, ANSI T1E1.4, ANSI, Secretariat, Alliance for Telecommunications Industry Solutions.

"Transmission and Multiplexing (™); Access transmission systems on metallic access cables; Very High speed Digital Subscriber line (VDSL); Part 1: Functional Requirements," ETSI Technical Report, DTS/TM.06003–1 (draft) v0.0.7 (Jan. 1998–1).

(List continued on next page.)

*Primary Examiner*—Betsy L. Deppe
(74) *Attorney, Agent, or Firm*—Nixon & Vanderhye P.C.

(57) ABSTRACT

The present invention provides an optimal procedure for determining in the time domain equalizer coefficients for an equalizer, where the equalizer compensates for the effects of the communications channel on the transmitted signal. A unit pulse or other training sequence which allows determination of the impulse response is transmitted over the communications channel, and a channel impulse response is estimated from the received signal. A cost function establishes a mean-square error associated with the estimated channel impulse response as compared to a desired impulse response signal. The value of the cost function varies based upon an offset value between the estimated channel impulse response and an equalized channel impulse response. Values of the cost function are determined for different offsets, and the offset that produces the smallest cost function value (corresponding to the minimum mean-square error) is selected. The optimal equalizer coefficients are then calculated using the selected offset and the established cost function.

12 Claims, 8 Drawing Sheets

OTHER PUBLICATIONS

J.A. C. Bingham, "Multicarrier modulation for data transmission: an idea whose time has come," IEEE Commun. Magazine, May 1990, pp. 5–14.

N. Al-Dahir and J.M. Cioffi, "Optimum Finite-Length Equalization for Multicarrier Transceivers," IEEE Trans Commun, vol. 44, No. 1, Jan. 1996, pp. 56–64.

N. Al-Dahir and J.M. Cioffii, "A Bandwidth-Optimized Reduced-Complexity Equalized Multicarrier Transceiver," IEEE Trans Commun, vol. 45, No. 8, Aug. 1997, pp. 948–956.

J.S. Chow and J.M. Cioffi, "A Cost-Effective Maximum Likelihood Receiver for Multicarrier Systems," Int. Conf. Commun., Chicago, IL, Jun. 1992, pp. 948–952.

I. Lee, J.S. Chow and J.M. Cioffi, "Performance Evaluation of a fast Computation Algorithm for the DMT in High-Speed Subscriber Loop," IEEE Journal Selected Areas Commun, vol. 13, No. 9, Dec. 1995, pp. 1564–1570.

Jacky S. Chow, John M. Cioffi and John A.C. Bingham, "Equalizer Training algorithms for Multicarrier Modulation System," Proceedings of the International Communication Conference, ICC'93, pp. 761–765.

Jacky S. Chow, J.C. Tu and John M. Cioffi, "A Computationally Efficient Adaptive Transceiver for High-Speed Digital Subscriber Lines," 1990, IEEE, pp. 1750–1754.

G. Dudevoir, J. Chow, S. Kasturia and J. Cioffi, "Combined equalization and coding for T1 data rates on carrier serving area subscriber loops," 1989 International Conference on Communication, Boston, Jun. 1989, pp. 536–540.

M. Alard and R. Lassale, "Principles of Modulation and channel coding for digital broadcasting for mobile receivers," EBU Review, No. 224, Aug. 1987, pp. 168–190.

G. Clark, S. Mitra and S. Parker, "Block implementation of adaptive digital filters," IEEE Trans on ASSP, vol. 29, pp. 744–572, Jun. 1981.

M. Van Bladel and M. Moeneclaey, "Time-domain Equalization for Multicarrier Communication," Proceedings of the IEEE Global Communication Conference, Globecome '95, pp. 167–171.

P.J.W. Melsa, R.C. Younce and C.E. Rohrs, "Impulse Response shortening for Discrete Multitone Transceivers," IEEE Trans commun, vol. 44, No. 12, Dec. 1996, pp. 1662–1672.

J.F. Van Kerckhove and P. Spruyt, "Adapted Optimization Criterion for FDM-based DMT-ADSL Equalization," Proceedings of the International Communication Conference, ICC'96, pp. 1328–1334.

T. Pollet, H. Steendam and M. Moeneclaey, "Performance Degradation of Multi-Carrier Systems caused by an Insufficient Guard Interval Duration," pp. 265–270.

K. Van Acker, G. Leus, M. Moonen, S. Claes and O. van de Wiel, An Improved Optimization Algorithm for the time Domain Equalizer Design in ADSL Modems, pp. 117–123.

W. Henkel, An Algorithm for Determining the DMT Time-Domain Equalizer Coefficients, Deutsche Telecom AG, contribution to Standards Committee ETSI STC TM6, 1997.

B. Farhang-Boroujeny, "Channel Memory Truncation for Maximum Likelihood Sequence Estimation," Proceedings of the Communication Theory Mini-Conference, Globecom '95, 1995.

Gaston Backman, "Rekursionsformel zur Lörsung der Normalgleichungen auf Grund der Krakovianenmethodik," Arkiv f.Matematik, Fysik och Astronomi, Bd 33 A, No. 1, 1945.

Czeslaw Kamela, "Die Lösung der Normalgleichungen nach der Metode von Prof. Dr. T. Banachiewicz," Scweizerische Zeitschr. F. Vermessungswesen und Kulturtechnik, Winterthur, Sep. 14, 1943.

Antoni Fertner, "Banachiewicz's Krakovian Calculus—a new Approach to the Least-Squares Amplitude Estimation of the digital Representation of the Signals obtained from Nuclear Radiation Detectors," Nuclear Instruments and Methods, No. 201, 1982.

Antoni Fertner, "Application of Krakovian Calculus to Adaptive Digital Filtering," Nuclear Instruments and Methods, No. 201, 1982.

*IEEE Transactions on Communication Technology*, vol. 17, No. 6, Dec. 1969, pp. 726–734, XP002079180, New York, US, Ephraim Arnon, "An Adaptive Equalizer for Television Channels".

* cited by examiner

EQUALIZER FOR USE IN MULTI-CARRIER MODULATION SYSTEMS

RELATED APPLICATION

This application is a continuation-in-part of commonly assigned, application Ser. No. 09/049,384, filed on Mar. 27, 1998 U.S. Pat. No. 6,185,251 and entitled "An Equalizer for use in Multi-Carrier Modulation Systems," the contents of which are incorporated herein.

FIELD OF THE INVENTION

The present invention relates to equalization, and more particularly, to equalizers used in multicarrier modulation systems.

BACKGROUND AND SUMMARY OF THE INVENTION

Asymmetric high speed Digital Subscriber Line (ADSL) and Very high speed Digital Subscriber Line (VDSL) are examples of modem communication systems which permit transmission of data over communication lines at very high rates, e.g., up to 52 Mbits/s. One example of a high speed data application is video on demand. The transmission of high-speed data over band-limited channels may be accomplished through the use of DMT-based, digital communications systems. DMT modems follow the general principle of transmitting data by dividing it into several interleaved bit streams, and using these bit streams to modulate several carriers.

A significant limitation in high data rate communication systems is intersymbol interference (ISI). One way to compensate for ISI in a DMT system is to add a cyclic prefix (guard time) to the beginning of each transmitted DMT symbol. Unfortunately, while increasing the length of prefixes reduces ISI, it also decreases the effective data rate. Another approach to combating ISI is to employ an equalizer at the receiver, but many equalizers require considerable and ongoing computation "overhead." There is a need, therefore, to keep the cyclic prefix length as small as possible and still compensate for ISI using an equalization technique that does not require complicated and ongoing computations.

For purposes of this application, equalization is the process of correcting or compensating for the ISI caused by the communications channel. In practical communications, the frequency response of the channel is not known. Accordingly, an equalizer is designed using numerous parameters that must be adjusted on the basis of measurements of a channel's signal-affecting characteristics.

A transversal filter having a delay line with taps spaced by T-seconds (where T is the sampling interval and $f_s=1/T$ is the sampling rate at the receiver) is a common choice for an equalizer. The outputs of the filter taps are multiplied by a filter coefficient, summed, and fed further to the signal processing circuitry. The tap coefficients correspond to the channel parameters and represent to some extent a "model" of the channel. If the coefficients are properly selected, the equalizer significantly attenuates or practically removes the interference from symbols that are adjacent in time to the desired symbol. The selection of the coefficient values is typically based on minimization of either peak distortion or mean-squared distortion. The coefficients are selected so that the equalizer output is forced towards zero at N sample points on either side of the desired pulse.

There are two general types of automatic equalization. The first equalization approach transmits a training sequence that is compared at the receiver with a locally-generated or otherwise known training sequence. The differences between the two sequences are used to set the equalizer filter coefficients. In the second approach, commonly referred to as adaptive equalization, the coefficients are continually and automatically adjusted directly from the transmitted data. A drawback of adaptive equalization is the computational "cost" involved in continually updating the filter coefficients so that the channel model is adapted to the current conditions of the channel. Equalizer coefficient computational methods employing adaptive algorithms such as the least mean square (LMS) or recursive least square (RLS) are computationally expensive. At a very high sampling rate for high data rate communications system, this kind of continual LMS updating of the equalizer filter coefficients is particularly expensive.

The present invention seeks to reduce both computational cost and cyclic extension, but at the same time effectively equalize received signals to compensate for ISI using a short length equalizer. For many communication applications, such as VDSL and ADSL, the communications channel does not change that much during a particular transmission. In this context of relative "constant" channel conditions, it is satisfactory to estimate the channel coefficients during an initial training sequence before the message is transmitted without thereafter adjusting the filter coefficient values during the transmission. Of course, it may be necessary to monitor channel quality during the transmission, and if channel quality decreases below a certain threshold, the equalizer coefficients could then be updated.

The present invention provides an optimal procedure for determining in the time domain equalizer coefficients for an equalizer, where the equalizer compensates received signals that are distorted by passing through the channel. A unit pulse is transmitted over the communications channel, and a channel impulse response is estimated from the received signal. A cost function establishes a mean-square error associated with the equalized channel impulse response as compared to a desired impulse response signal. The value of the cost function varies based upon an offset value between the estimated channel impulse response and an equalized channel impulse response. Values of the cost function are determined for different offsets, and the offset that produces the smallest cost function value (corresponding to the minimum mean-square error) is selected. The optimal equalizer coefficients are then calculated using the selected offset and the established cost function.

In a preferred embodiment, the invention is applied to multicarrier modulation systems. Moreover, the cost function is defined as a krakovian function that depends on the ofrset value. That krakovian function includes a first krakovian which uses the channel impulse response and a second krakovian which uses the autocorrelation of the channel impulse response. Using the first and second krakovians and the selected offset corresponding to the minimal value of the established cost function, the optimal equalizer coefficients are determined in a straightforward, one step calculation.

A better understanding of the features and advantages of the present invention will be obtained by reference to the following detailed description of the invention and the accompanying drawings which set forth an example embodiment in which the principles of the invention are utilized.

DETAILED DESCRIPTION OF THE INVENTION

In the following description, for purposes of explanation and not limitation, specific details are set forth, such as particular modulation/demodulation techniques, applications, protocols, etc. in order to provide a thorough understanding of the present invention. For example, the present invention is described in the context of a multicarrier modulation digital communications system in which krakovian algebra is used to facilitate calculation of optimal equalizer coefficients. However, it will be apparent to one skilled in the art that the present invention may be practiced in other embodiments that depart from such specific details. In other instances, detailed descriptions of well-known methods, protocols, devices, and circuits are omitted so as not to obscure the description of the present invention with unnecessary detail.

Multicarrier Modulation System

Figure 1:
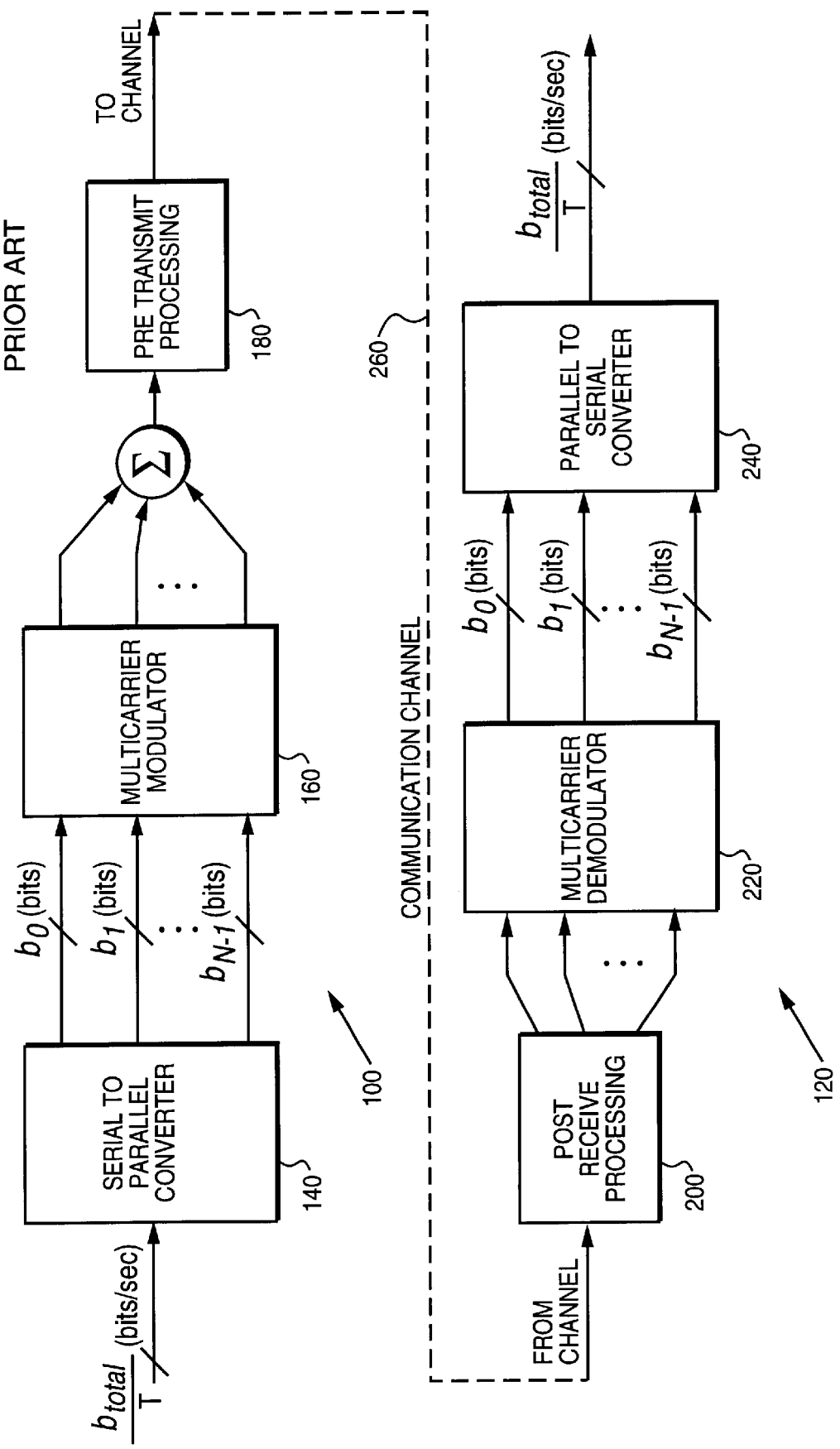
FIG. 1 is a block diagram illustrating a basic prior art multicarrier transmitter, communication channel, and receiver.

FIG. 1 shows an example Discrete Multitone (DMT) communication system in which the present invention may be employed. In a Discrete Multitone system, in general, the input bit stream is first serial-to-parallel converted. The parallel output is then grouped into N groups of bits corresponding to the number of bits per symbol. Portions of bits are allocated to each DMT carrier.

More specifically, transmitter 100 includes a serial-to-parallel converter 140, a multicarrier modulator 160, and a pretransmit processor 180. Receiver 120 includes a post channel processor 200, a multicarrier demodulator 220, and a parallel-to-serial converter 240. The transmitter and receiver are linked in this example by a digital subscriber line (DSL) or other form of communication channel 260. Serial input data at a rate of $b_{total}/T_{symb}$ bits per second are grouped by converter 140 into blocks of $b_{total}$ bits for each multicarrier symbol, with a symbol period of $T_{symb}$. The $b_{total}$ bits in each multicarrier symbol are used to modulate N separate carriers in modulator 160 with $b_i$ bits modulating the i-th carrier.

Figure 2:
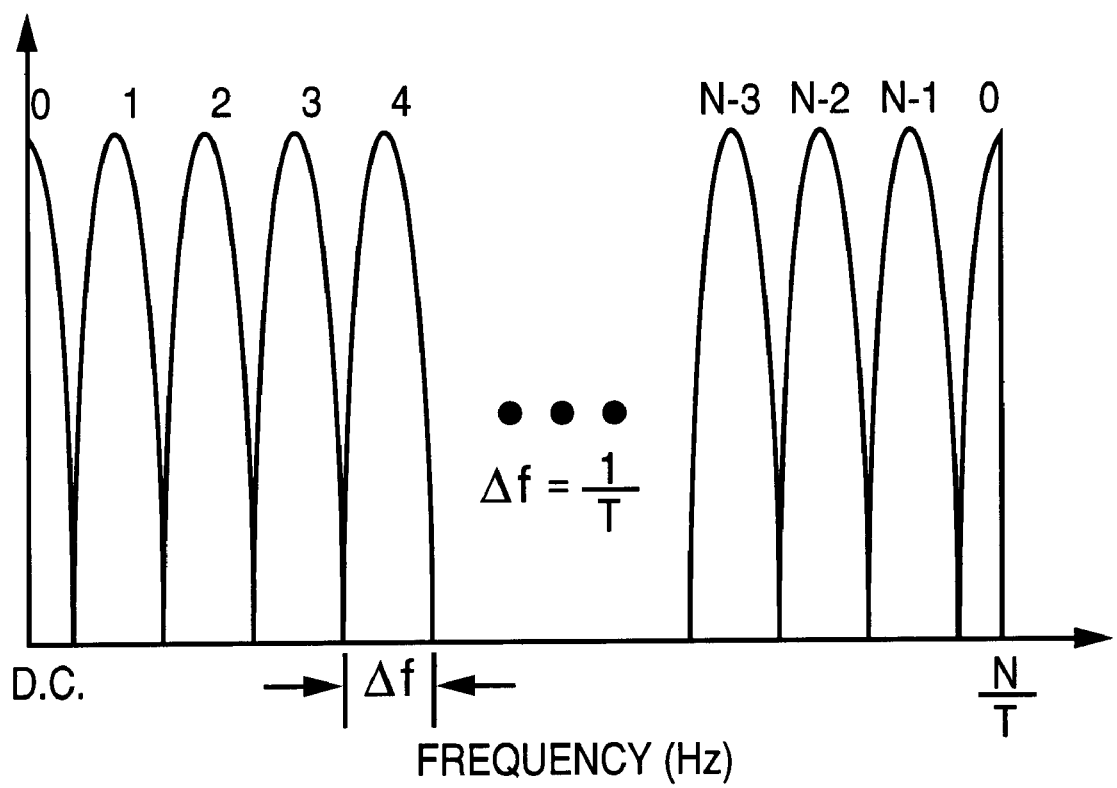
FIG. 2 is a diagram conceptually illustrating frequency domain discrete multi-tone modulation (DMT)

An Inverse Discrete Fourier Transform (IDFT) is used as a DMT modulator to generate $N_s$ time-domain samples of a transmit signal for each block of $b_{total}$ bits, where $N_s$ is preferably equal to twice the number of modulated carriers, i.e., 2N. The corresponding multicarrier demodulator performs a Discrete Fourier Transform (DFT), where $b_i$ bits are recovered from the $i^{-th}$ sub-carrier. As depicted in FIG. 2, the carriers or subchannels in a DMT system are spaced 1/T Hz apart across N/T Hz of the frequency band. More detailed discussion of the principles of multicarrier transmission and reception is given by J. A. C. Bingham in "Multicarrier Modulation for Data Transmission: An Idea Whose Time Has Come", *IEEE Communications Magazine*, Volume 28, Number 5, pp. 5–14, May 1990, the contents of which are incorporated herein.

In a Discrete Multitone Modulation system, $\{X_0, X_1, \ldots, X_{N-1}\}$ is the original, complex, input data symbol, $\{S_n\}$ is the modulated data sequence (before cyclic prefix), $\{h_n\}$ is the discrete-time channel impulse response (CIR), $\{\eta_n\}$ is an additive noise sequence, and $\{x_n\}$ is the received sequence. Adding the cyclic prefix is a discrete-time technique used to eliminate ISI in the DMT system. However, as described in the background, it is desirable to minimize the length of the prefix in order to maximize data throughput assuming the receiver equalizer can effectively remove or otherwise compensate for ISI. The independent modulating and demodulating vectors are the IDFT and the DFT given by the following general relationships:

$$X_k = \sum_{n=0}^{2N-1} x_n e^{\frac{-j2\pi kn}{N}} \quad k = 0, 1, \ldots, 2N-1 \tag{1}$$

$$x_k = \frac{1}{2N} \sum_{n=0}^{2N-1} X_k e^{\frac{j2\pi kn}{N}} \quad n = 0, 1, \ldots, 2N-1 \tag{2}$$

A DMT system with N channels for transmitting complex data requires a DFT size of 2N because of forced Hermite symmetry in the frequency domain. The Hermite symmetry is necessary in order to obtain real-valued samples in the time domain. In a preferred embodiment, IDFT and DFT are implemented using IFFT and FFT algorithms using, for example, an approach disclosed in commonly-assigned "Method and Apparatus for Efficient Computation of Discrete Fourier Transform and Inverse Discrete Fourier Transform," U.S. patent application Ser. No. 08/887,467, filed on Jul. 2, 1997, U.S. Pat. No. 5,987,005, the contents of which are incorporated herein.

Figure 3:
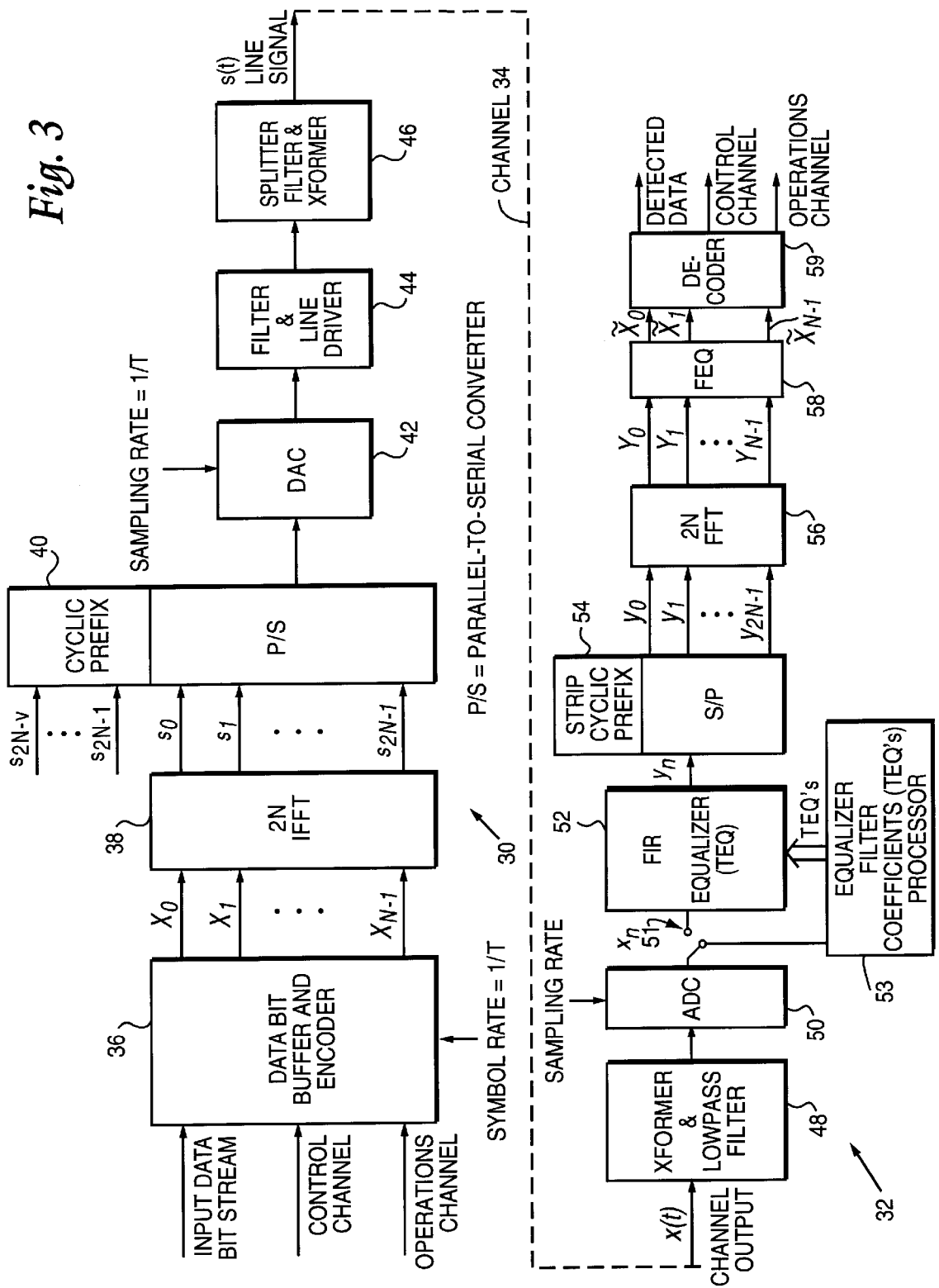
FIG. 3 is a block diagram depicting the principle components of a DMT communications system in which the present invention may be advantageously employed.

FIG. 3 is a block diagram showing the principal operative components of a basic DMT transmitter 30 and a basic DMT receiver 32 connected through a channel 34. Serial input data are grouped into blocks, converted to a parallel form, and appropriately encoded by an encoder 36. Each one of the N active subchannels contains a number of $b_k$ bits allocated to that subchannel. The total number of bits in a DMT symbol is therefore:

$$b_{total} = \sum_{k=1}^{N} b_k \tag{3}$$

Each of the N bit groups is mapped by the symbol into a two-dimensional signal constellation. The relation between the number of bits in each block of bits $b_k$ and the necessary number of signal points in a constellation M is given by:

$$M_k = 2^{b_k} \tag{4}$$

The signal points in a constellation are typically arranged in a rectangular pattern for even values of $b_k$ and a cross for odd values of $b_k$. Provided that the same signal energy is used for all constellations, the distance between neighboring signal points is reduced with increasing constellation size resulting in increased BER with the same signal-to-noise ratio (SNR).

The output from the encoder is N complex numbers, one for each group of bits, which are then fed to a device that calculates the Inverse Discrete Fourier Transform (IDFT). The output is a real sequence that can be considered the superimposing of N modulated orthogonal carriers spaced $$\Delta f \text{ apart}, \Delta f = \frac{f_s}{N}.$$

The parallel IFFT output is converted back to a serial data stream by a converter 40. The digital modulated data stream is cyclically prefixed, converted to analog form by a digital-to-analog converter (DAC) 42, low-pass filtered at 44, and passed through a splitter filter and D.C. isolating transformer 46 during pre-transmit processing to produce an analog signal transmitted over a transmission channel 34.

At the receiver, the received analog signal is passed through a D.C. isolating transformer and low-pass filter 48, converted to digital form by an analog-to-digital converter (ADC) 50, time domain pre-equalized by a finite impulse response (FIR) filter 52 to reduce the effective memory of the channel, and stripped of the cyclic prefix during post-receive processing in converter 54. The resulting digital signals are demodulated by 2N FFT operation 56 and converted to parallel frequency domain signals. Since the amplitude vs. frequency and the delay vs. frequency responses of the channel are not necessarily constant across the entire frequency band, the received signal differs from the transmitted signal, and the parallel inputs to the frequency domain equalizer (FEQ) 58 differ from the parallel outputs from the encoder 36. It is the task of the FEQ 58 to compensate for these differences. The equalized signals can then be properly decoded and converted back to a serial form by the decoder 59. Ideally, the detected output serial data from the decoder 59 is the same as the input serial data to the encoder 36.

The preferred example embodiment of the present invention employs a Time Domain Equalizer (TEQ) 52 which shortens the overall channel impulse response and therefore reduces ISI. The present invention finds particular advantageous application in the training of the time domain equalizer 52. During a training mode of operation, a switch 51 is actuated (for example by a general data processor controlling the receiver) to connect the output of the analog-to-digital converter 50 to an equalizer filter coefficients processor 53 which calculates optimal TEQ coefficient values for a particular communications channel. Those optimal values are used to set the coefficients in equalizer 52. After training, the switch 51 is moved to directly connect the sampled output from the ADC to the equalizer 52 for operation in the normal equalization mode.

Figure 4:
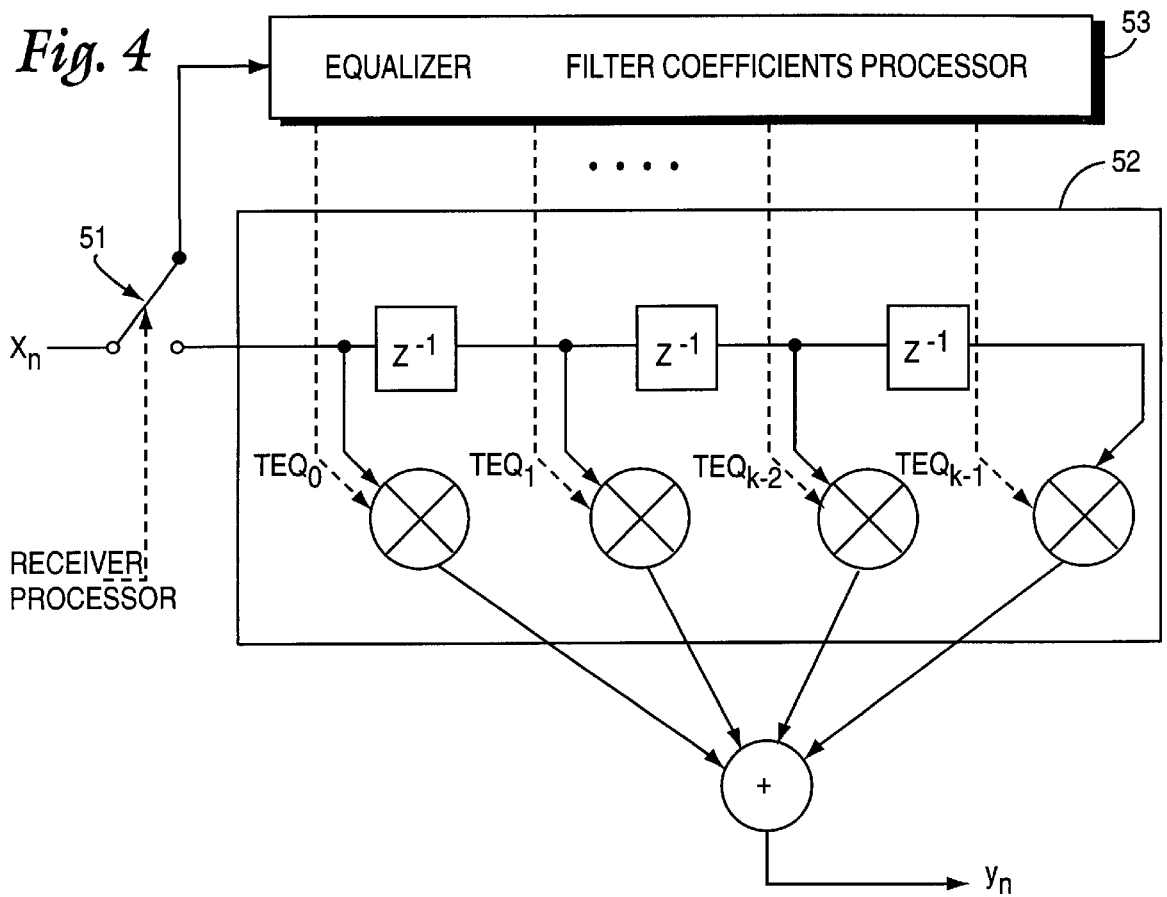
FIG. 4 is a more detailed block diagram illustrating a time domain equalizer in accordance with the present invention.

FIG. 4 illustrates the equalizer 52 in additional detail. In the training mode, the received sampled signal $x_n$ is routed to the equalizer filter coefficients processor 53 for calculation of the filter coefficients $TEQ_0$, $TEQ_1$, ... $TEQ_{K-2}$, and $TEQ_{K-1}$ in accordance with calculation procedures described in detail below. The equalizer 52 is essentially a transversal filter corresponding to a delay line with $z^{-1}$ symbol taps, where $z^{-1}$ corresponds to a sampling interval T. The tapped signals are weighted or multiplied by a corresponding filter coefficient value TEQ in a corresponding multiplier. The multiplier products are summed and output as $y_n$. The filter coefficients, which can be expressed as a vector $TEQ_n$, are set to minimize negative effects of interference from symbols that are adjacent in time to the desired symbol. In general, the criterion for selecting the TEQ coefficients is based on minimizing mean-square error caused by such interference.

As described above, a multicarrier transmitter serial-to-parallel converts an input data stream to sub-symbols that are distributed to modulate carriers which are orthogonal on the symbol duration $(2N+v)T$, where T denotes the sampling interval. Assuming N sub-symbols distributed over 2N carriers and imposing Hermitian symmetry, i.e., $X_k^m = (X_{2N-k}^m)^*$, the transmitted sequence $s_n$ in the time domain is given by:

$$s_n = \frac{1}{2N} \sum_{m=-\infty}^{\infty} \sum_{k=0}^{2N-1} X_k^m e^{2\pi jk \frac{n}{2N}} \tag{5}$$

where $X_k^m$ is the sub-symbol conveyed by sub-carrier k during the m-th symbol, and the factor $$\frac{1}{2N}$$

is introduced to normalize the overall transmission power.

The overall channel is considered to include the physical channel plus the filtering performed in the transmit and receive circuitry at both ends of the channel. The channel impulse response (CIR) is assumed to be linear. Denoting CIR by h(t), and providing cyclic extension consisting of v samples, the received analog signal is given by:

$$x(t) = \frac{1}{2N} \sum_{m=-\infty}^{\infty} \sum_{k=0}^{2N-1} \sum_{n=-v}^{2N-1} X_k^m h(t - nT - m(2N+v)T) e^{2\pi jk \frac{n}{2N}} + \eta(t) \tag{6}$$

$$= \frac{1}{2N} \sum_{m=-\infty}^{\infty} \sum_{k=0}^{2N-1} X_k^m \sum_{n=-v}^{2N-1} h(t - nT - m(2N+v)T) e^{2\pi jk \frac{n}{2N}} + \eta(t)$$

$$= \frac{1}{2N} \sum_{m=-\infty}^{\infty} \sum_{n=-v}^{2N-1} h(t - nT - m(2N+v)T) \sum_{k=0}^{2N-1} X_k^m e^{2\pi jk \frac{n}{2N}} + \eta(t)$$

where $\eta(t)$ is the additive white gaussian noise (AWGN) with one-sided spectral density $N_0$.

At the receiver, the cyclic prefix samples are discarded, and FFT (demodulation) is performed on the 2N real-valued samples. Inspecting equation (6), the innermost summation corresponds to the Fourier coefficient of the CIR associated with the sub-carrier k. Hence, after demodulation, each symbol only needs to be corrected by a complex coefficient associated with the channel transfer function that includes a phase shift and attenuation. Alternatively, in the time domain, it may be seen as convolution of the modulated sequence with the channel impulse response.

As described earlier, the channel causes ISI which may severely deteriorate system performance (e.g., poor symbol decisions). The dispersiveness of the channel may be compensated for by adding guard time. For DMT systems, each symbol is cyclically extended (the v last samples are repeated at the beginning of the block data) so that input sequence "looks" periodic. Again, the disadvantage of cyclic extension is reduced throughput efficiency which is proportional to the extension length, i.e., by a factor $$\frac{2N}{2N+v}.$$

For severe-ISI channels, throughput efficiency becomes intolerably low. Increasing N or v increases computational complexity, system delay, and memory requirements of the transceiver, and hence the cost of transceiver increases quite significantly. This problem is solved in the present invention using a short-length, computationally "inexpensive" equalizer.

Mathematical Principles Used to Formulate the Equalizer

The complete suppression of ISI requires that the equalized signal, $y_n$, be identical to the transmitted sequence, $s_n$, up to an offset $n_0$ (defined greater detail below):

$$y_n = \gamma \cdot s_{n-n_0} \qquad (7)$$

where $\gamma$ represents an arbitrary scaling factor. If the original sequence $\{X_k\}$ to be transmitted is complex, it is reformatted as a Hermite symmetric sequence. To simplify the notation, the index "m" which represents the symbol number is dropped. Thereafter, the IDFT of the Hermite symmetric sequence is calculated, (which corresponds to modulation), producing a real signal which is transmitted over the channel. The received signal is then demodulated using the DFT.

The equalizer in accordance with the invention is therefore designed to determine a vector $TEQ_n$ such that when $TEQ_n$ operates on (or filters) the sampled received signal, $x_n$, the result, $y_n$, is (to a great extent) a replica of the originally transmitted sequence $s_n$, i.e., $$y_n = TEQ_n \otimes x_n \qquad (8)$$

Substituting $x_n$ using equation (6) results in:

$$y_n = \qquad (9)$$

$$\frac{1}{2N}\sum_{m=-\infty}^{\infty}\sum_{n=-v}^{2N-1} TEQ_n \otimes h(t - nT - m(2N+v)T) \sum_{k=0}^{2N-1} X_k^m e^{2\pi jk\frac{n}{2N}} + \eta'_n$$

where $\eta'$ is filtered external noise, and the symbol $\otimes$ depicts convolution.

In order for the equalizer to perfectly suppress ISI, it must satisfy the following:

$$TEQ_n \otimes h_n = \gamma \cdot \delta(n-n_0) + \eta''_n \qquad (10)$$

where $\eta''_n$ represents the deviation of the overall channel impulse response (CIR) from the desirable (ideal) unit pulse $\delta(n)$, i.e., the error due to imperfect equalization. The goal is to compensate the CIR ($h_n$) so that $\eta''_n$ is reduced to zero. Therefore, in the absence of noise and using an infinite length $TEQ_n$, it is theoretically possible to achieve complete suppression of ISI. But in practical applications, the equalizer is of finite length. Assuming an offset $n'_0$ associated with unknown delay introduced by the channel $n_0$, channel model deviation (or channel misfit) $\eta''_n$, and external noise sources $\eta'_n$, the mean error may be minimized towards zero using the Least Squares principle.

Examining the limited number of equalizer coefficients $TEQ_n$ necessary to minimize the error $\eta''_n$, assuming an originally transmitted dirac pulse $\delta(n)$, we insert equation (9) into equation (10) and obtain:

$$y_n = \frac{1}{2N}\sum_{m=-\infty}^{\infty}\sum_{n=-v}^{2N-1}(\gamma \cdot \delta(n-n_0) + \eta''_n)\sum_{k=0}^{2N-1} X_k^m e^{2\pi jk\frac{n}{2N}} + \eta'_n \qquad (11)$$

$$= \gamma \cdot s_{n-n_0} + \frac{1}{2N}\sum_{m=-\infty}^{\infty}\sum_{n=-v}^{2N-1}\eta''_n \sum_{k=0}^{2N-1} X_m^k e^{2\pi jk\frac{n}{2N}} + \eta'_n$$

$$= \gamma \cdot s_{n-n_0} + \eta'''_n + \eta'_n$$

where $\eta'''_n$ depicts the noise sequence due to the imperfectly equalized channel.

The filtering operation, as described by equation (9), involves the convolution of an infinitely long sequence with a finite one. Using krakovian algebraic notation, equation (10) may be rewritten as the following:

$$\begin{Bmatrix} TEQ_0 \\ \vdots \\ TEQ_{K-1} \end{Bmatrix} \begin{Bmatrix} h_{m1} & \cdots & h_0 & \cdots & h_{m2} \\ \vdots & & \vdots & & \vdots \\ h_{m1-(K-1)} & \cdots & h_{K-1} & \cdots & h_{m2-(K-1)} \end{Bmatrix} = \qquad (12)$$

$$\gamma \cdot \begin{Bmatrix} 0 \\ \vdots \\ 1 \\ \vdots \\ 0 \end{Bmatrix} + \begin{Bmatrix} \varepsilon_{m1} \\ \vdots \\ \varepsilon_{n_0} \\ \vdots \\ \varepsilon_{m2} \end{Bmatrix}$$

where: indices m1→$-n_0$ and m2→∞, $h_0$ represents a first maximum amplitude of the sampled CIR (before equalization), $\gamma \cdot \tau \{0, \ldots, 0, 1, 0, \ldots, 0\}$ represents the desired CIR, and $\varepsilon_k$ is error sequence comprising both filtered external noise and noise due to imperfect channel equalization referred to hereafter as an observation error $\varepsilon$.

The following is a brief and basic description of krakovian algebra. A krakovian is defined as a set of elements (numbers, symbols, or other krakovians) arranged in rectangular array of m columns and n rows so that the krakovian has a dimension m×n. The elements of a krakovian are indexed according to their position, namely by column and row number. Krakovian algebra is not the same as matrix algebra. In fact, some of the different properties of krakovians, not found in regular matrix algebra, are employed in the preferred embodiment to achieve a significant reduction in data processing overhead.

In krakovian algebra, the product of two krakovian factors a and b consists of accumulated cross-products of the columns of krakovians a and b. The product element is written in the product column having the same column number as the first factor a and in the product row having the same number as the column of the second factor b:

$$p_{ij} = \sum_{k=1}^{n} a_{ik} b_{jk} \qquad (13)$$

Thus, krakovian multiplication requires the same number of rows. If the product a·b exists, then the product b·a always exists and is equal to the transpose of a·b. This definition leads to a laws of commutation and association that are different from the commonly known matrix laws.

A special krakovian, referred to as the diagonal krakovian, includes all "1's" on the NW-SE diagonal and "0's" in every other location and is depicted by the Greek letter $\tau$. When the krakovian $\tau$ occurs as a second multiplicand, it plays a similar role in the krakovian algebra as does unity in the arithmetic of ordinary numbers. However, a krakovian $\tau$ as the first multiplicand causes a krakovian transpose. These statements may be expressed as follows:

$$a \cdot \tau = a \tag{14}$$

$$\tau \cdot a = \tau a \tag{15}$$

where the transpose of a krakovian means as it does in regular matrix algebra:

$$(\tau a)_{ij} = a_{ji} \tag{16}$$

Changes in the order of multiplying krakovians follow certain rules. The krakovian association law states:

$$a \cdot b \cdot c \cdot d \cdot e \cdot f = a \cdot (e \cdot \tau d \cdot \tau c \cdot \tau b) \cdot f \tag{17}$$

The krakovian law of dissociation is $$a \cdot (b \cdot c \cdot d \cdot e) \cdot f = a \cdot \tau e \cdot \tau d \cdot \tau c \cdot b \cdot f \tag{18}$$

Krakovians do not fulfill certain matrix algebra relationships, e.g., $$(a \cdot b) \cdot c \neq a \cdot (b \cdot c) \tag{19}$$

With this very brief explanation of krakovian algebra, we return to the derivation of the optimal equalizer filter coefficients. Equation (12) may be rewritten in more compact form in krakovian notation $$TEQ_n \cdot \tau \alpha = l + \epsilon \tag{20}$$

where $TEQ_n$ is a vector containing coefficients $TEQ_0 \ldots TEQ_{K-1}$ of the time domain equalizer 52, $\alpha$ is a krakovian containing samples of the received channel impulse response (CIR), l is a krakovian vector showing a "best" sample location for the received unit pulse, $\epsilon$ is a vector representing the observation error, and $\tau$ denotes transpose. The degree of the $TEQ_n$ satisfies $K \leq n_0 + m2$ since equation (12) represents an over-determined system. Hereafter, a description of krakovian dimensions is omitted when clear from the context.

The krakovian vector l on the right side of the equation (20) is purposefully configured to have only one non-zero element at the offset position $n'_0$, where $-n_0 < n'_0 \leq m2$. Vector l will be referred to as the "coordinate vector" because of a physical interpretation as the delay introduced by a communication channel. The offset $n'_0$ is the sampling time difference between the first maximum peak of the CIR and the peak of the equalized CIR. As is shown below, the choice of the offset $n'_0$ affects minimum mean-square-error. Hence, $n'_0$ must be selected to minimize the mean square error.

The mean square error may be viewed as all of the output energy except for the energy transmitted in position $n'_0$, and is established as a cost function $J(n'_0)$ corresponding to the square of the observation error.

$$J(n'_0) = \{(TEQ_n \otimes h_n) - \gamma \cdot \delta(n - n'_0)\}^2 \tag{21}$$

The cost J is calculated at multiple offsets $n'_0$. The optimal coefficient vector $TEQ_n$, (i.e., the optimal filter coefficients), may be obtained when the cost function $J(n'_0)$ reaches a minimum. If the solution of equation (21) exists in a mean-square sense, the krakovian $\alpha$ containing the sampled CIR, $h_k$, must fulfill the following constraint. The square of $\alpha$ must be "positive definite" which means that $(\alpha)^2$ must be capable of being inverted.

The following assumptions and manipulations, using krakovian algebra, are useful in efficiently solving equation (21) for minimum mean-square error. Equation (20) may be expressed using krakovian notation as:

$$TEQ' \cdot \tau \alpha' = \epsilon \tag{22}$$

where $TEQ' = \tau\{TEQ_n u\}$, $u = -1$, and $\alpha' = \{\alpha 1_{n'_0}\}$. This assumption permits squaring of both sides since equation (22) provides the error in a "pure" form which permits easy calculation of the cost function J $$J = (TEQ' \cdot \tau \alpha')^2 = \epsilon^2 \tag{23}$$

Equation (23) may be manipulated using krakovian algebra, resulting in the following:

$$\epsilon^2 = (TEQ' \cdot \tau \alpha')^2 = TEQ' \cdot (\alpha')^2 \cdot TEQ' = (TEQ' \cdot \tau r'')^2 \tag{24}$$

Given that the krakovian $\alpha$ corresponds to the CIR, the krakovian $(\alpha)^2$ corresponds to the autocorrelation (AC) of the CIR. As is well known, the autocorrelation function and power spectral density are Fourier transform pairs. The receiver demodulator in a DMT system can be used to generate the autocorrelation of the CIR.

Taking the square root of equation (24) results in $$TEQ' \cdot \tau r'' = \tau\{w_0 \ldots w_{k-1} w_K\} \tag{25}$$

Recall that the goal is to minimize the square error which can now be expressed as $$\epsilon^2 = \sum_{k=0}^{K} w_k^2 = \text{minimum} \tag{26}$$

The Krakovian root r" has the structure given by the following notation:

$$r'' = \begin{Bmatrix} r & \rho \\ 0 & w \end{Bmatrix} \tag{27}$$

where r is the upper triangle with positive diagonal entries, 0 depicts zeros below the main diagonal, and $\tau\{\rho w\}$ is the last column of r". Using the above notation, we obtain from equation (25)

$$TEQ_n \cdot \tau r + u\rho = \tau\{w_0 \ldots w_{K-1}\} \tag{28}$$

$$w = w_K \tag{29}$$

Equation (28) always has a solution irrespective of the choice of $w_0, \ldots, w_{K-1}$. However, the minimum of mean-square-error expressed in equation (26) is achieved when $$w_0 = \ldots = w_{K-1} = 0 \tag{30}$$

In other words, $w^2$ is the least possible value of $\epsilon^2$, where $\epsilon^2$ is equal to the cost function $J(n'_0)$ for a particular coordinate vector $1_{n'_0}$ which can be expressed as:

$$\min(\epsilon^2) = w^2 = J(n'_0) \tag{31}$$

Using these properties, the sum of squared observational errors is calculated without the use of an adaptive algorithm like the gradient search algorithm. Instead, a purely algebraic procedure is employed thereby circumventing the difficulties associated with the existence of local minima, and achieving the optimal solution in a finite number of steps corresponding to the number of choices of $n'_0$.

Equation (24) yields $$(\alpha')^2 = (r'')^2 \quad (32)$$

Combining equation (22) and equation (27) with equation (32) results in $$(r)^2 = (\alpha)^2 \quad (33)$$

$$\rho \cdot r = l_{n'_0} \cdot \alpha \quad (34)$$

$$w^2 = (l_{n'_0})^2 - (\rho)^2 = 1 - (\rho)^2 \quad (35)$$

Substituting equations (34) and (30) into equation (28) and using equation (33), we obtain a formula for determining the optimum value of the vector $TEQ_n$:

$$TEQ_n = -u(l_{n'_0} \cdot \alpha) \cdot ((\alpha)^2)^{-1} \quad (36)$$

The term $(l_{n'_0} \cdot \alpha)$ corresponds to the $n'_0$-th column of the krakovian $\alpha$, and the inverted krakovian $((\alpha)^2)^{-1}$ may be physically interpreted as the inverse of a krakovian consisting of the autocorrelation sequence of the channel impulse response.

From equation (36), the corresponding value of the cost function $J(n'_0)$ can then be expressed as:

$$J(n'_0) = 1 + u TEQ_n \cdot (l_{n'_0} \cdot \alpha) \quad (37)$$

or equivalently $$J(n'_0) = 1 - u^2 (l_{n'_0} \cdot \alpha) \cdot ((\alpha)^2)^{-1} \cdot (l_{n'_0} \cdot \alpha) \quad (38)$$

In this form, the cost function $J(n'_0)$ may be computed and its minimum determined without any knowledge of the equalizer filter coefficients $TEQ_n$. Since determining the optimum equalizer coefficients $TEQ_n$ is the end goal, the traditional "fitting" procedure is reversed in the present invention. Instead of searching for the minimum mean-square-error by adaptively adjusting filter coefficients, (e.g., using recursive LMS), the optimum equalizer coefficients are, determined in a single step as described below after the search for minimum mean-square-error is accomplished using equation (38).

To determine the minimum mean-square error, the cost function $J(n'_0)$ in equation (38) is determined for discrete choices of offset $n'_0$ position. A good initial guess about the region of search for the minimum of cost function can be obtained by the analysis of available communication channels. This cost function determination procedure is purely algebraic and discrete, therefore the cost function need not be differentiable. In fact, the cost function $J(n'_0)$ is non-differentiable in respect to the offset $n'_0$. Thus, the only necessary assumption is the non-singularity of the inverse krakovian $((\alpha)^2)^{-1}$. The optimum short-length equalizer coefficients $TEQ_n$ may be determined in a single step from equation (36) using the column vector $l_{n'_0} \cdot \alpha$ obtained in equation (38) for which the minimum value of $J(n'_0)$ was obtained in equation (36), keeping in mind the krakovian $(\alpha^2)^{-1}$ is a constant.

Equalizer Coefficient Setting Procedure

Figure 5:
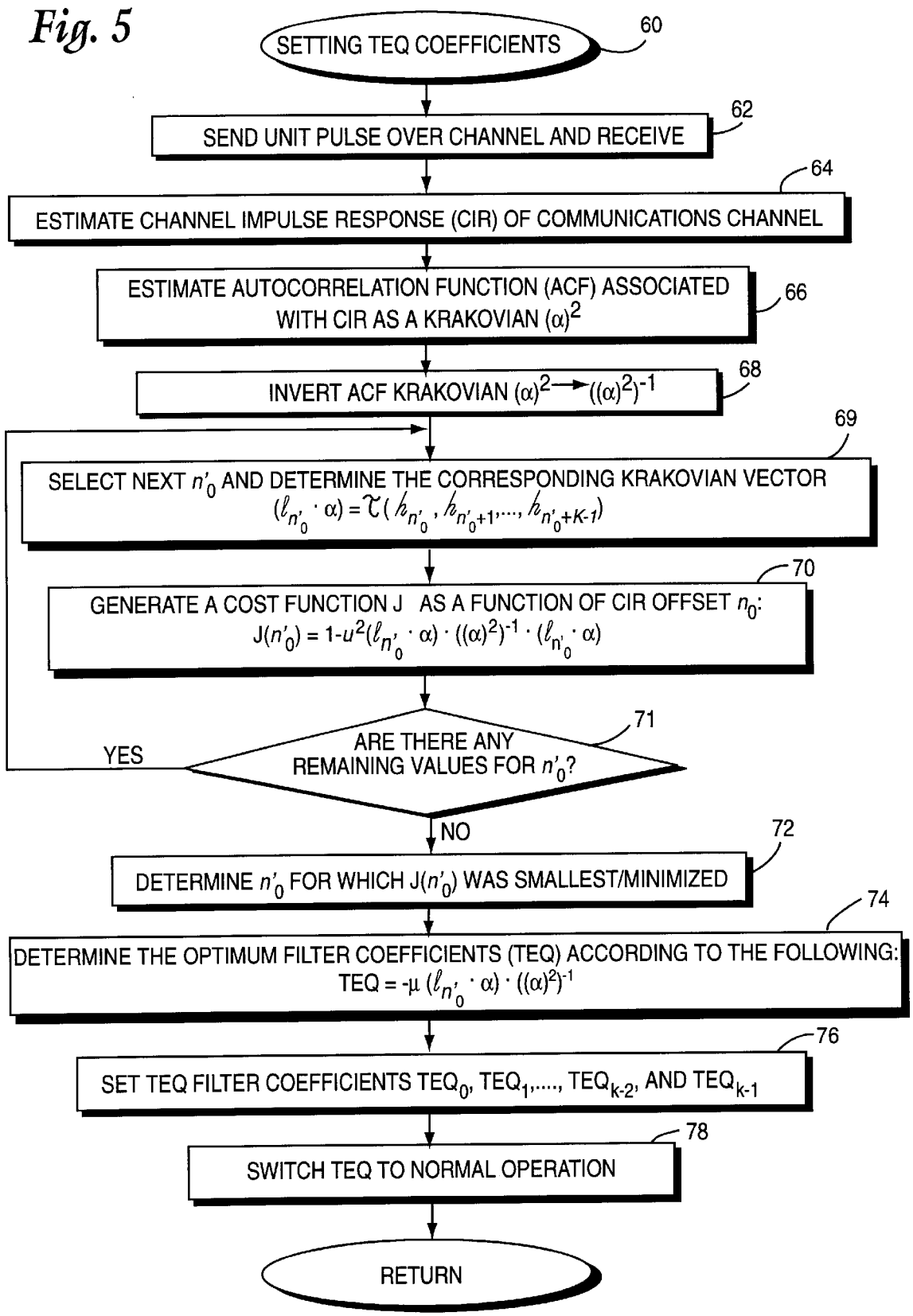
FIG. 5 is a flowchart diagram illustrating procedures for setting the time domain equalizer coefficients in accordance with an example embodiment of the present invention.

Having demonstrated the underlying mathematical principles of the present invention, a routine (block 60) for determining the optimal equalizer coefficients in accordance with an example implementation of the invention is now described in conjunction with the flowchart in FIG. 5.

Switch 51 is connected to the equalizer filter coefficients processor 53 when training the equalizer 52. A unit or dirac pulse is transmitted over the channel and received in the receiver (block 62). The equalizer filter coefficients processor 53 processes the received samples $x_n$ and estimates a channel impulse response (CIR) of the communications channel (block 64). Using the channel impulse response, the equalizer filter coefficients processor 53 estimates the autocorrelation function (ACF) associated with the just-estimated channel impulse response as a krakovian $(\alpha)^2$ (block 66). The autocorrelation function krakovian is then inverted taking advantage of the Toeplitz structure of the krakovian $(\alpha)^2$ to generate $((\alpha)^2)^{-1}$ (block 68). Using the estimate of the CIR, the following krakovian vector is formed: $(l_{n'_0} \cdot \alpha) = \tau(h_{n'_0}, h_{n'_0}, h_{n'_0+K-1})$ (block 69).

The next task is to calculate the cost function J as a function of the channel impulse response offset $n'_0$ using equation (38) (block 70). Various channel impulse response offset values are inserted into block 69 in order to determine that offset $n'_0$ for which the cost function $J(n'_0)$ is the smallest, i.e., minimum mean-square error (block 72). The optimum equalizer filter coefficients $TEQ_n$ are then determined using equation (36) (block 74). Once calculated, the equalizer filter coefficients processor 53 then sets the equalizer filter coefficients $TEQ_0$, $TEQ_1$, . . . $TEQ_{K-2}$, and $TEQ_{K-1}$ to the calculated optimal values (block 76). After the coefficients are set, switch 51 is then moved to the normal position, and the equalizer 52 processes received signal samples $x_n$ using the set TEQ filter coefficients. Equalizer output samples $y_n$ are then compensated for the channel-induced ISI (block 78).

Performance of an Equalizer Implemented Using the Invention

Figure 6:
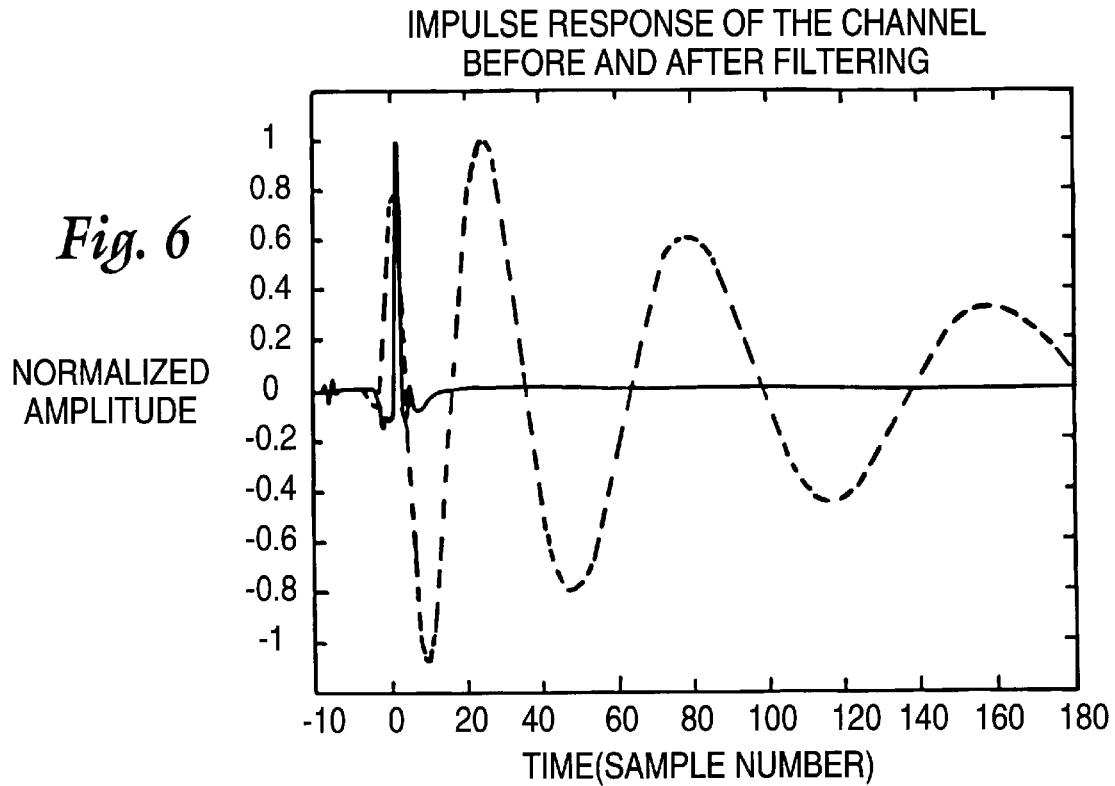
FIG. 6 is a graph showing the normalized channel impulse response as well as the same channel impulse response after equalization in accordance with the present invention as a function of time/sample number.

FIGS. 6–9 are now described to illustrate the performance of an example implementation of the present invention by way of simulated tests. A one kilometer telephone loop was chosen as an example communications channel. A unit impulse was transmitted over that telephone loop. FIG. 6 graphs normalized amplitude on the vertical axis versus time (indicated as received sample number) on the horizontal axis. The channel impulse response (CIR) received corresponding to the transmitted unit pulse is shown as an oscillating waveform (indicated as a dashed line) having multiple "pulses" which obviously adversely interferes with adjacent symbols. In contrast, the same channel impulse response after equalization (shown as a solid line) includes only one very narrow spike shortly after the first maximum pulse of the unequalized channel impulse response. Accordingly, the equalized channel impulse response resembles very much the originally transmitted unit pulse with minimal overlap onto adjacent symbols.

Figure 7:
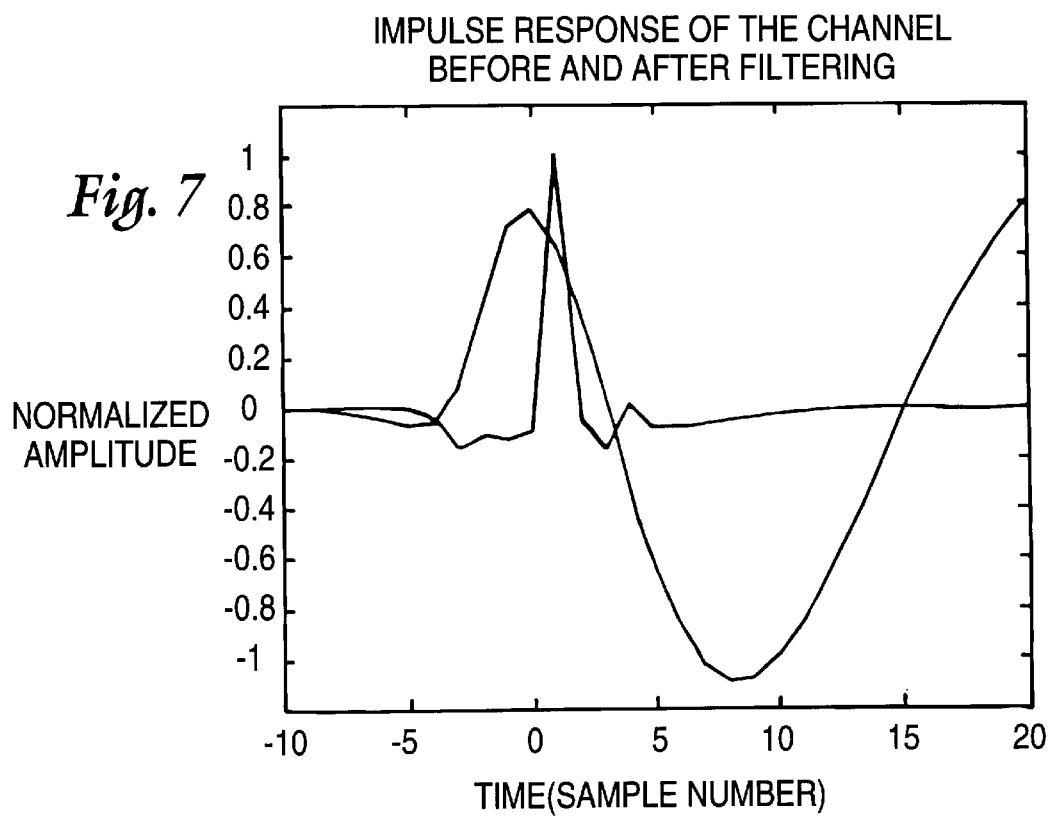
FIG. 7 is a graph showing an enlarged portion of FIG. 6.

FIG. 7 enlarges the portion of the graph in FIG. 6 around the first maximum of the CIR from a reference chosen at sample zero. It is easy to see that the channel impulse response offset $n'_0$, defined as the offset between the first maximum of the channel impulse response and the point at which the cost function $J(n'_0)$ is minimized, corresponds to one sampling interval.

Figure 8:
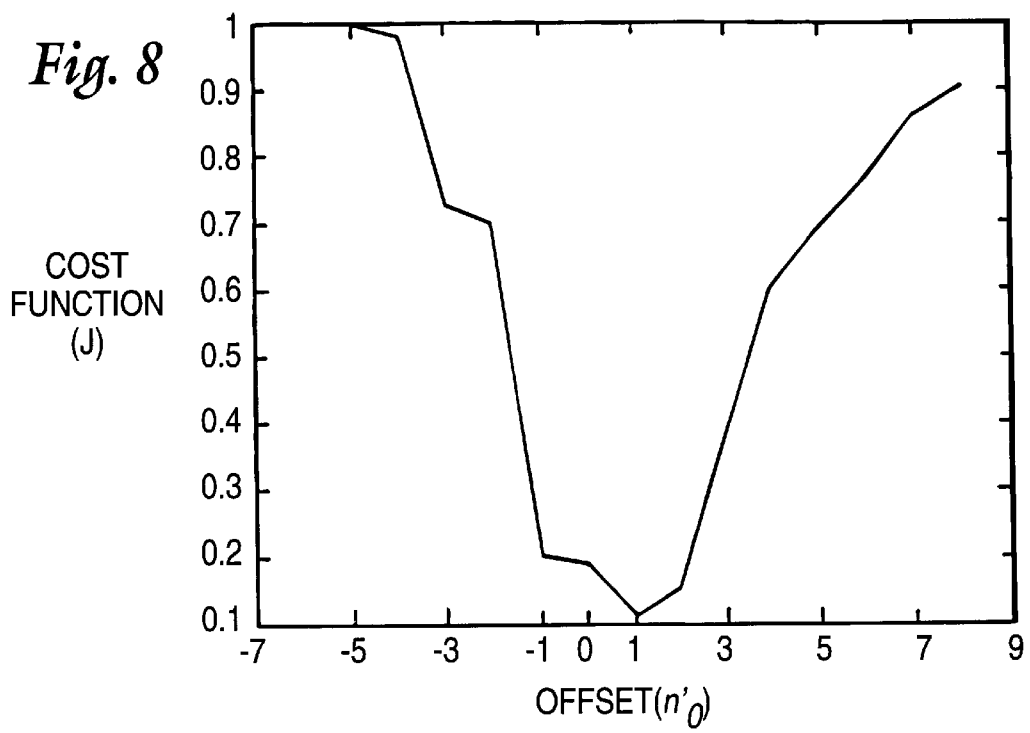
FIG. 8 is a graph illustrating the cost function (J) in accordance with the present invention for various offset values ($n'_0$)

FIG. 8 illustrates this point somewhat differently by graphing the cost function $J(n'_0)$ on the vertical axis as a function of the offset $n'_0$. The first maximum of the unequalized channel response is at time sample zero. By substituting different offset $n'_0$ values, e.g., −3, −2, 1, 2, 3, etc., and calculating the cost function, the graph in FIG. 8 clearly shows that the minimum cost function value is at an offset $n'_0$ equal to one sample time from sample zero.

Figure 9:
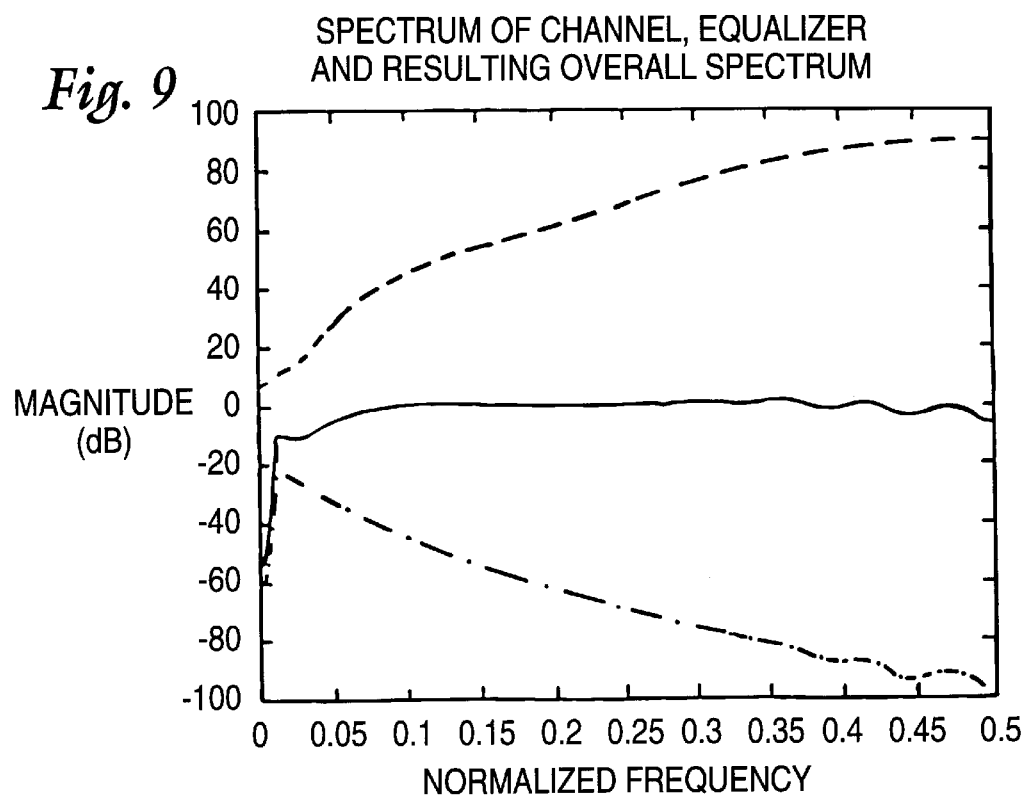
FIG. 9 is a graph showing the spectra of the communications channel and equalizer in accordance with the present invention, and the resulting spectrum.

FIG. 9 illustrates the overall performance of this example equalizer. The spectrum of the one kilometer telephone loop channel is illustrated as the dashed dot line. The equalizer's spectrum is shown as the dashed line and substantially mirrors the spectrum of the communications channel. The resulting spectrum equalized in accordance with the present invention (shown as a solid line) is for the most part flat which corresponds to optimal equalization.

Figure 10:
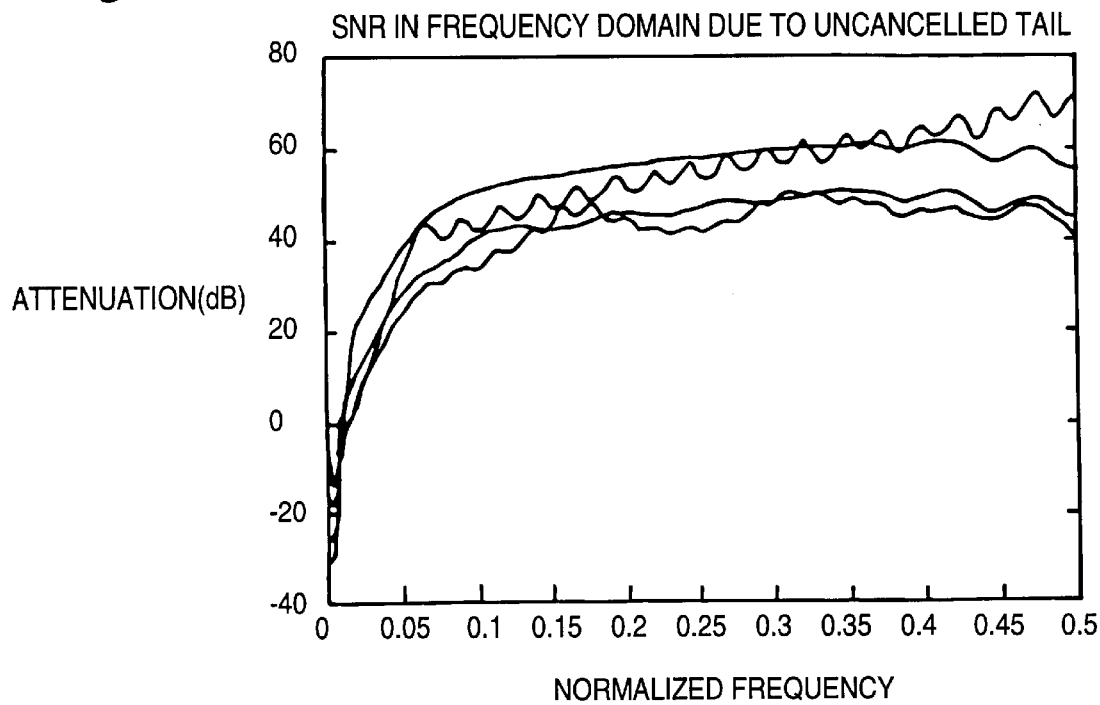
FIG. 10 is a graph showing signal-to-noise (SNR) ratios of an equalizer used in a DMT receiver in accordance with the present invention for various DMT cyclic extension values.

Comparing the original channel impulse response with the equalized channel impulse response, it is clear that the present invention offers a substantially improved signal-to-noise ratio performance with respect to intersymbol interference. FIG. 10 illustrates, for this example in a DMT environment, SNR performance in the frequency domain due to the uncancelled, oscillating "tail" of the channel impulse response, (which causes intersymbol interference), for various length DMT cyclic extensions. As is evident from FIG. 10, there is no dramatic difference in SNR even though different cyclic extension length values are used (64, 32, and 16). Accordingly, using the present invention, shorter cyclic extensions may be used resulting in greater throughput efficiency.

Optimal equalization is achieved in the present invention using a short length, non-recursive equalizer that has a number of advantages over gradient-based, recursive equalizer algorithms. One well known drawback of gradient, recursive algorithms is their susceptibility to local minima. The present invention avoids this problem using the algebraic principle of minimizing mean square error. Instead of differentiating the cost function, the cost function's value is explicitly monitored for discrete choices of the channel impulse response offset vector until a minimum is found. Thereafter, the optimum equalizer coefficients of a short length equalizer are readily calculated in non-recursive fashion and with relatively small computation cost.

Alternative Numerical Algorithm for Calculating Optimum Equalizer Coefficients

An alternative numerical algorithm for calculating optimum equalizer coefficients from the channel impulse response and noise will now be described. This alternative algorithm uses the Square Root Free Cholesky Decomposition and krakovian division techniques instead of krakovian inversion and/or square root. The computational complexity during minimum mean square error search can be reduced by a factor of about two per choice of the coordinate vector at the cost of a slightly lower efficiency at the start-up phase.

As described above, krakovian calculus can be used to determine an optimum time-domain equalizer (TEQ). The resulting algorithm allows optimization of the value of "delay" introduced by a dispersion in the channel and corresponding set of the optimum filter coefficients simultaneously. This is achieved through the monitoring of mean-square-error until minimum mean-square-error (MMSE) is reached. A constraint that TEQ is the K-tap FIR filter was imposed. Under this assumption, the above-described algorithm is summarized by the following equations:

$$TEQ_n = -u(l_{n'_0} \cdot \alpha) \cdot ((\alpha)^2)^{-1} \quad (36)$$

where $TEQ_n$ vector of the optimum filter coefficients corresponding to the relative delay $n'_0$, $((\alpha)^2)^{-1}$ is an inverse of a krakovian consisting of auto-correlation sequence of the channel impulse response (CIR) and noise, $(l_{n_0} \cdot \alpha)$ is $n'_0$-th column of the krakovian $\alpha$ (and has the simple physical interpretation as a K-point long fragment of CIR).

The corresponding value of the cost function ($J_{n_0}$) can be expressed as:

$$J(n'_0) = 1 + uTEQ_{n'} \cdot (l_{n'0} \cdot \alpha) \quad (37)$$

or equivalently $$J(n'_0) = 1 - u^2 (l_{n'0} \cdot \alpha) \cdot ((\alpha)^2)^{-1} \cdot (l_{n'0} \cdot \alpha) \quad (38)$$

The cost function is estimated for discrete choices of $n'_0$ within the predefined region of search. The global minimum of the $J(n'_0)$ providing MMSE can be found in a finite number of guesses. Vector $TEQ_n$ corresponds to the best possibly achievable TEQ coefficients. The procedure is discrete and purely algebraic; therefore, the cost function must not be differentiable with respect to the coordinate value $n'_0$. The only necessary assumption is non-singularity of $((\alpha)^2)^{-1}$.

As will now be discussed, the cost function may be computed and its minimum determined, without knowledge about the coefficients.

This may be better understood by expressing equation (38) as follows:

$$J(n'_0) = 1 - u^2 ((l_{n'0} \cdot \alpha) \cdot (\tau r)^{-1})^2 \quad (39)$$

where r is square root of the krakovian $((\alpha)^2)$, r being defined as upper triangle with positive diagonal entries.

Equation (39) requires a scalar product of the krakovian resulting from $(l'_{n_0} \cdot \alpha) \cdot (\tau r)^{-1}$ This product can be replaced by a krakovian division (Tadeusz Banachiewicz, "Rachunek Krakowianowy z zastosowaniami" (Krakovian Calculus with applications in Polish), PWN, Warszawa 1959)

$$(l'_{n_0}) \cdot (\tau r)^{-1} = (l_{n'0} \cdot \alpha) \div \tau r \quad (40)$$

which in the case of triangular krakovian is trivial and may achieved applying backsubstitution. It may be best described in the self explaining code set forth below and requires $$\frac{K(K-1)}{2}$$

multiplications.

Thus, the krakovian square root technique may be used during the MMSE search. However, the krakovian square root involves K scalar square roots that appears on the diagonals and divide the rows—a major complication at the start-up phase. Accordingly, Square Root Free Cholesky Decomposition is used. Preferably, the technique described in Bierman, "Factorization Methods for Discrete Sequential Estimation", Chapter III, Academic Press, Inc. (1977) (the contents of which are incorporated herein) is used.

The krakovian $((\alpha)^2)$ is factored $$((\alpha)^2) = U \cdot D \cdot U \quad (41)$$

where U is upper (lower) triangle with unit diagonal elements, and D is diagonal with elements $d_j = d_{jj} \neq 0$ and zero elsewhere.

Substituting for $((\alpha)^2)^{-1} = U^{-1} \cdot D^{-1} \cdot U^{-1}$ in equation (38) and applying successively the dissociation and association laws yields a quadratic form in the components of L.

$$J(n'_0) = 1 - u^2 L \cdot D^{-1} \cdot L \quad (42)$$

where $L = (l_{n'0} \cdot \alpha) \cdot \tau U^{-1}$. since $\tau D^{-1}$ is diagonal, equation (42) may be expressed in the very useful form $$J(n'_0) = 1 - u^2 \sum_{j=0}^{K-1} L_j^2 \cdot d_j^{-1} \qquad (43)$$

where $L_j$ depicts an element of the vector L.

Equation (43) suggests to calculate vector L first, square its elements, divide them by corresponding $d_j$, and add all together. Applying krakovian division to determine vector L instead of calculating the inverse of the krakovian U $$L = (l_{n'_0} \cdot \alpha) \cdot \tau U^{-1} = (l_{n'_0} \cdot \alpha) \div \tau U \qquad (44)$$

results in $$\frac{K(K-1)}{2} + K$$

multiplications and K divisions per choice of $n'_0$. The latter procedure should be compared to numerical complexity of the equations (36) and (37) or equation (38) of $K^2+K$ multiplications per choice.

The numerical effort is less in the case of Toeplitz krakovian inversion than in the case of its decomposition. Namely, using the Trench algorithm, inversion can be accomplished with $13K^2/4$ flops while the Square Root Free Cholesky Decomposition requires $2K^3/3$ flops. See Golub et al. "Matrix Computations", The Johns Hopkins University Press (1989). However, the reduction of the numerical complexity during the MMSE search phase can more than compensate for a slightly worse performance at the initial phase.

The K divisions indicated by equation (44) can be performed in the initial phase, in order to be replaced by multiplications during MMSE search phase. Hence, the computation effort is $$\frac{K(K-1)}{2} + 2K$$

multiplications per choice of the $n'_0$ and no divisions. Execution of equation (43) is repeated until the MMSE is not achieved. Optimum TEQ coefficients can be determined in the single step $$TEQ_n = -u((l_{n'_0} \cdot \alpha) \div \tau U) \cdot \tau D^{-1} \cdot U^{-1} \qquad (45)$$

Noting that $$((l_{n'_0} \cdot \alpha) \div \tau U) \cdot \tau D^{-1} = \tau \{L_0^2 \cdot d_0^{-1}, L_1^2 \cdot d_1^{-1} \ldots L_{K-1}^2 \cdot d_{K-1}^{-1}\}, \qquad (46)$$

the intermediate results during calculations of the MMSE, equation (43) can be reused for determining optimum coefficients. Krakovian division completes the algorithm at the cost of an additional $$\frac{K(K-1)}{2}$$

multiplications. Comparing the $K^2+K$ multiplication per choice required by the first krakovian procedure described above with the $$\frac{K(K-1)}{2} + 2K$$

multiplications of the alternative algorithm, it can be seen that for all K, the processing scheme following equations (36) and (37) requires increasingly more calculations than the processing scheme following equations (43) and (44). The total savings depends on the width of the assumed region of search and should be compared with the deterioration of numerical efficiency due to factorization.

Figure 11:
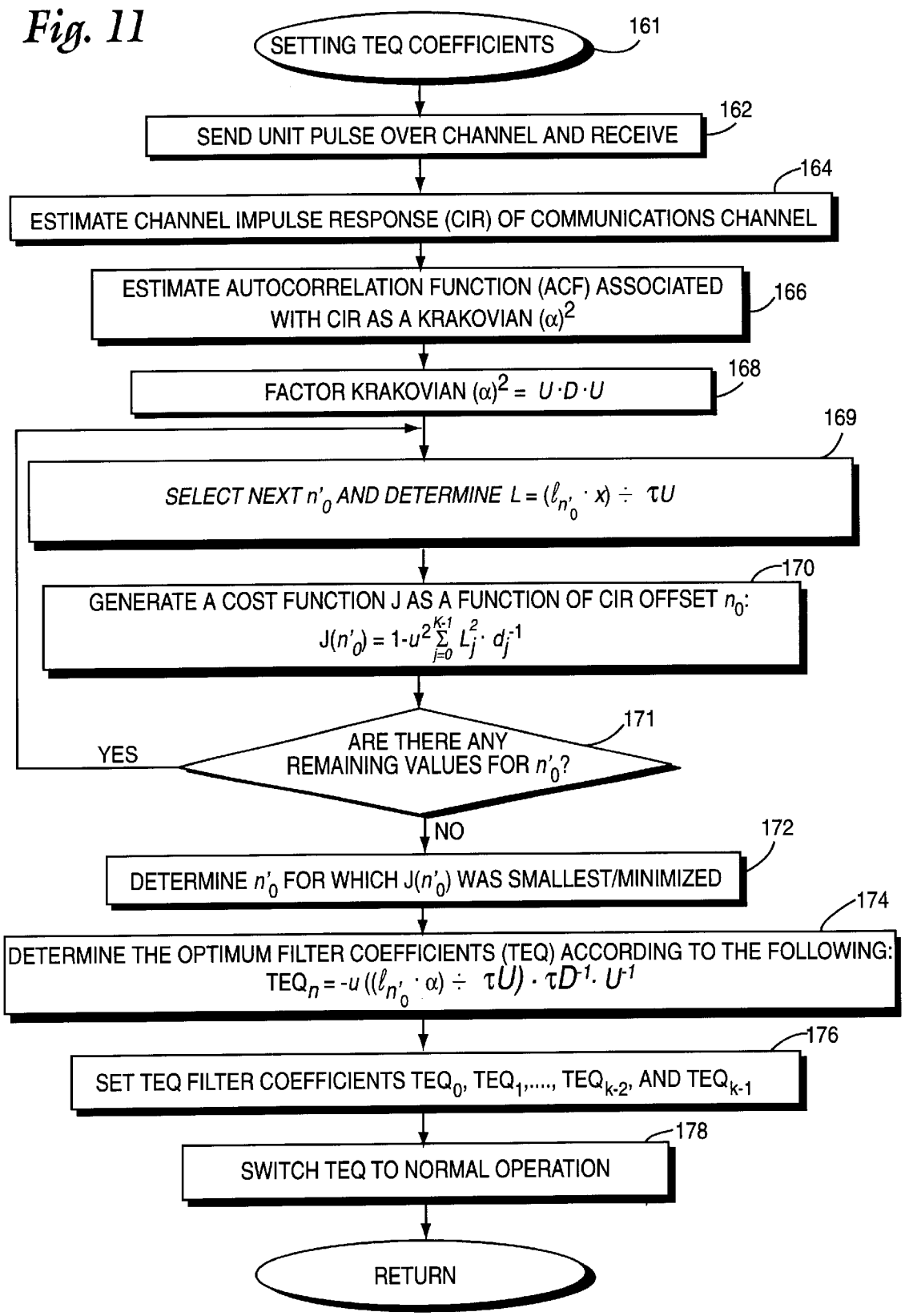
FIG. 11 is a flowchart diagram illustrating procedures for setting the time domain equalizer coefficients in accordance with another example embodiment of the present invention.

FIG. 11 is a flowchart showing the steps of a routine (block 161) for determining the optimal equalizer coefficients in accordance with the alternative numerical algorithm. Switch 51 is connected to the equalizer filter coefficients processor 53 when training the equalizer 52. A unit or dirac pulse or other training sequence is transmitted over the channel and received in the receiver (block 162). The equalizer filter coefficients processor processes the received samples $x_n$ and estimates a channel impulse response (CIR) of the communications channel (block 164). Using the channel impulse response, the equalizer filter coefficients processor 53 estimates the autocorrelation function (ACF) associated with the just-estimated channel impulse response as a krakovian $(\alpha)^2$ (block 166). The autocorrelation function krakovian is then factored (block 168) and the vector L is determined using krakovian division in accordance with equation (44) (block 169).

Next, the cost function J is calculated as a function of the channel impulse response offset $n'_0$ using equation (43) (block 170). Various channel impulse response offset values are inserted into the block 169 in order to determine that offset for $n'_0$ for which the cost function $J(n'_0)$ is the smallest, i.e., minimum mean-square error (block 172). The optimum equalizer filter coefficients $TEQ_n$ are then determined using equation (45) (block 174). Once calculated, the equalizer filter coefficients processor 53 then sets the equalizer filter coefficients $TEQ_0, TEQ_1, \ldots, TEQ_{K-2}$, and $TEQ_{K-1}$ to the calculated optimal values (block 176). After the coefficients are set, switch 51 is then moved to the normal position and the equalizer 52 processes received signals $x_n$ using the set TEQ coefficients. Equalizer output samples $y_n$ are then compensated for the channel-induced ISI (block 178).

As discussed above, the inversion of krakovian $((\alpha)^2)$ can be advantageously substituted by square root free Cholesky decomposition. The resulting deterioration of numerical efficiency at the initial phase is compensated by the savings during MMSE search.

The deterioration in the initial phase is due to a less efficient factorization algorithm and involves an additional K divisions. However, factorization allows krakovian division that reduce the numerical complexity during the MMSE search phase by a factor of about two.

Division by Triangular Krakovian

Krakovian division is a rather complex algebraic problem and therefore will not be described in detail. In the case of a vector divided by a triangular krakovian, the problem can be reduced to trivial backsubstitution. The resulting vector may be found recursively:

L(1)=h($n'_0$)

i=2, . . . , K

L(i)=[h($n'_0$-i)-L(1:i-1)*U(1:i-1,i)]/U(i,i)

The division is nonexistent because by definition $U(i,i)=1$.

Note that factorization is not an unambiguous operation. In accordance with whether one prefers to obtain an upper or lower triangular solution, the direction of recursion will be changed, e.g., the succession maybe: $i=K-1, \ldots, 1$.

While the invention has been described in connection with is practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a receiver that receives signals transmitted over a communications channel where the received signals are compensated in an equalizer for effects of the communications channel on the transmitted signal, a method, comprising:

estimating a channel impulse response for the communications channel;

estimating an autocorrelation function associated with the channel impulse response as a krakovian;

decomposing the krakovian;

determining an error associated with imperfect equalization using the decomposed krakovian;

determining a cost function associated with the error; and calculating coefficients for the equalizer using the determined cost function.

2. The method in claim 1, wherein the cost function defines a square error associated with an equalized version of the channel impulse response compared to a desired channel impulse response.

3. The method in claim 2, wherein a value of the cost function varies depending on an offset of the estimated channel impulse response and the equalized version of the channel impulse response.

4. The method in claim 3, further comprising:

determining the value of the cost function for different offsets, and selecting the offset that produces the smallest cost function value, wherein the equalizer coefficients are calculated using the selected offset.

5. The method in claim 1, wherein the channel impulse response and corresponding autocorrelation function are determined using an initial training signal such as a unit pulse transmitted over the communication channel to the receiver.

6. A receiver that receives signals transmitted over a communications channel comprising:

an equalizer that compensates the received signal for effects of the communications channel on the transmitted signal; and a processor that determines parameters of the equalizer associated with the communications channel by decomposing a krakovian representation of an estimated autocorrelation function of an estimated channel impulse response of the communications channel.

7. The receiver in claim 6, wherein the equalizer is a equalizer implemented as a finite impulse response (FIR) transversal filter having multiple taps and corresponding equalizer coefficients.

8. The receiver in claim 7, wherein the equalizer includes a training mode, during which optimal equalizer coefficients are calculated and set by the processor, and a normal operation mode, during which the set coefficients are used to weight the signals at the corresponding filter tap, the weighted signals being summed to produce an equalized signal.

9. The receiver in claim 7, wherein the receiver is a discrete multi-tone (DMT) receiver.

10. The receiver in claim 7, wherein the processor determines a squared error between the estimated channel impulse response and a desired impulse response and calculates the equalizer coefficients minimizing the squared error.

11. The receiver in claim 10, wherein a value of the squared error varies depending on an offset of the estimated channel impulse response and an equalized version of the channel impulse response.

12. The receiver in claim 11, wherein the processor determines the value of the squared error for different offsets, selects the offset that produces the smallest squared error value, and calculates the equalizer coefficients using the selected offset.

* * * * *